United States Patent [19]
Pfaff

[11] Patent Number: 5,123,518
[45] Date of Patent: Jun. 23, 1992

[54] APPARATUS FOR PROPERLY POSITIONING VIALS

[76] Inventor: Ernest H. Pfaff, 1549 Woodvale Ave., Deerfield, Ill. 60015

[21] Appl. No.: 806,721

[22] Filed: Dec. 12, 1991

[51] Int. Cl.$^5$ ............................................. B65G 47/84
[52] U.S. Cl. .............................. 198/480.1; 198/473.1; 198/719; 198/723
[58] Field of Search ............... 198/423.1, 480.1, 481.1, 198/719, 723

[56] References Cited

U.S. PATENT DOCUMENTS

| | | | |
|---|---|---|---|
| 611,364 | 9/1898 | Holden | 198/481.1 |
| 2,549,663 | 4/1951 | Clark | 198/723 |
| 4,534,460 | 8/1985 | Graham et al. | 198/481.1 |
| 5,046,599 | 9/1991 | Hamano | 198/481.1 |
| 5,056,650 | 10/1991 | Kronseder | 198/473.1 |

Primary Examiner—Joseph E. Valenza
Attorney, Agent, or Firm—Lee, Mann, Smith, McWilliams, Sweeney & Ohlson

[57] ABSTRACT

A device for properly positioning upstanding vials that are exiting from or entering on to a conveyor. A guide wheel, having a plurality of identations for the vials, is driven by a coaxial propulsion wheel located beneath the guide wheel. A stationary guide adjacent to the guide wheel is spaced sufficiently to permit the vials to pass one at a time between the stationary guide and the guide wheel. The wheels are mounted via an arm at an angle to the conveyor so that one edge of the propulsion wheel rests on and is driven by the conveyor. Therefore, the rotational speed of the guide wheel matches the surface speed of the conveyor so that the vials are properly released onto the conveyor or captured from the conveyor without being upset.

12 Claims, 2 Drawing Sheets

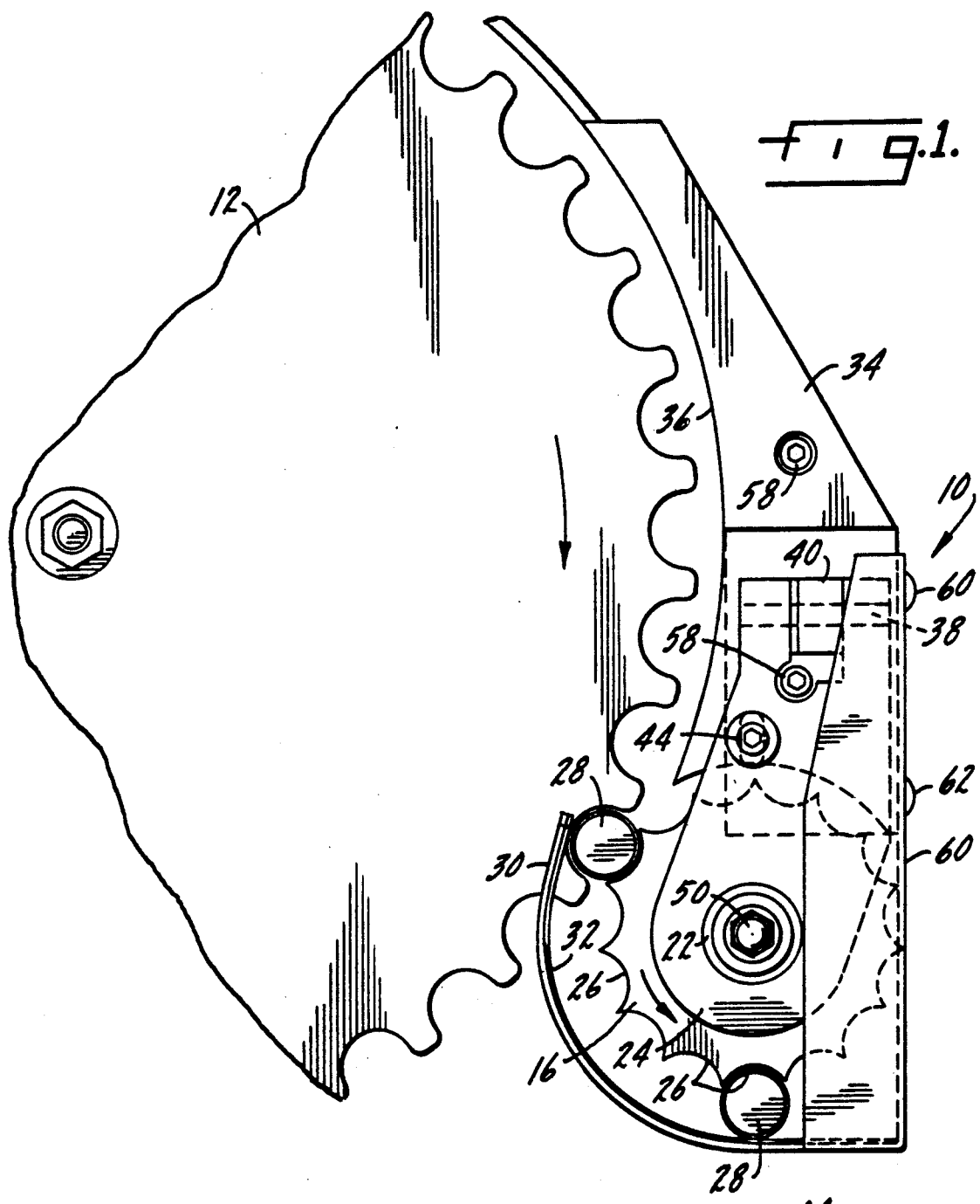
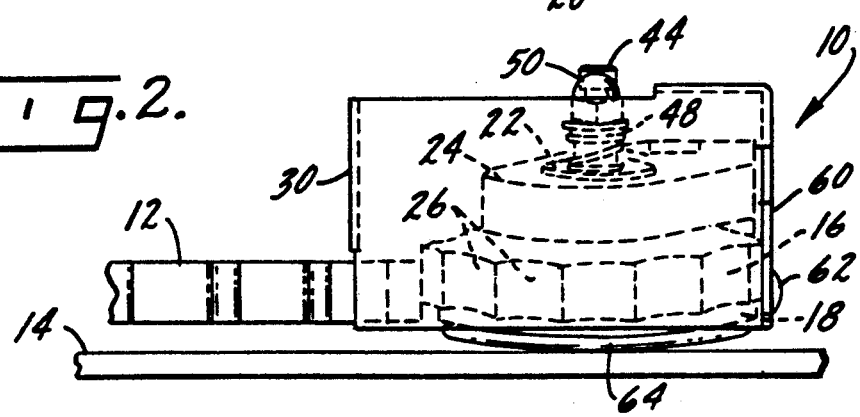

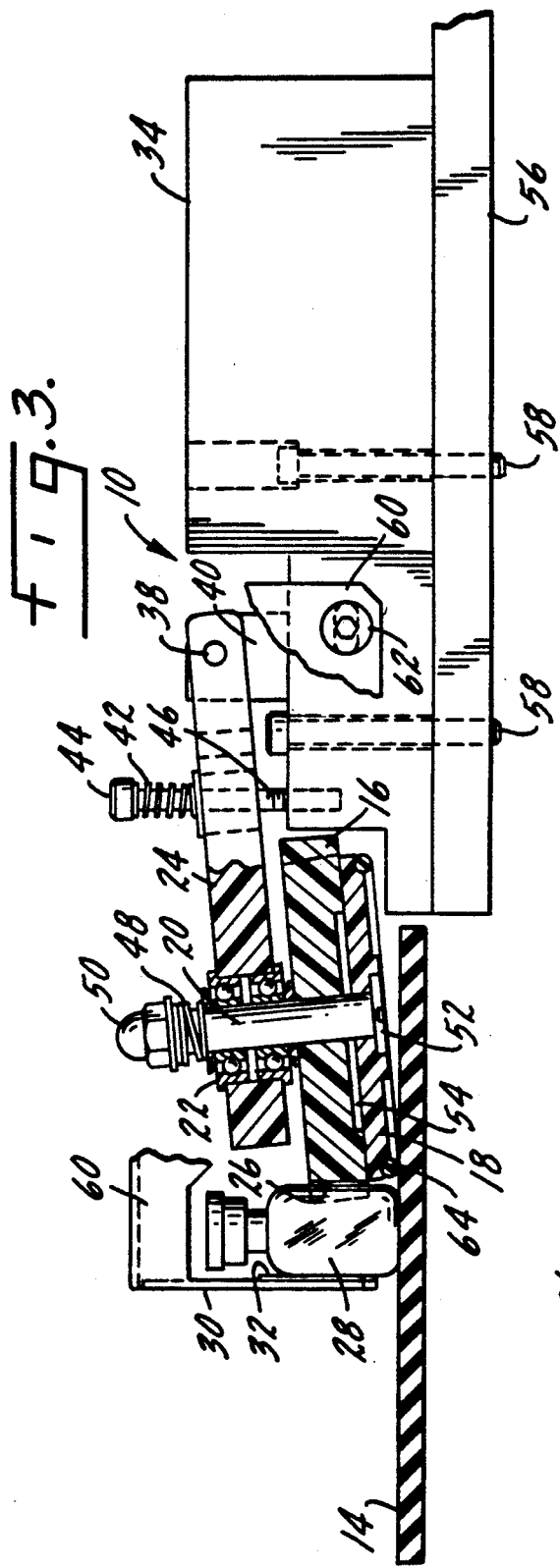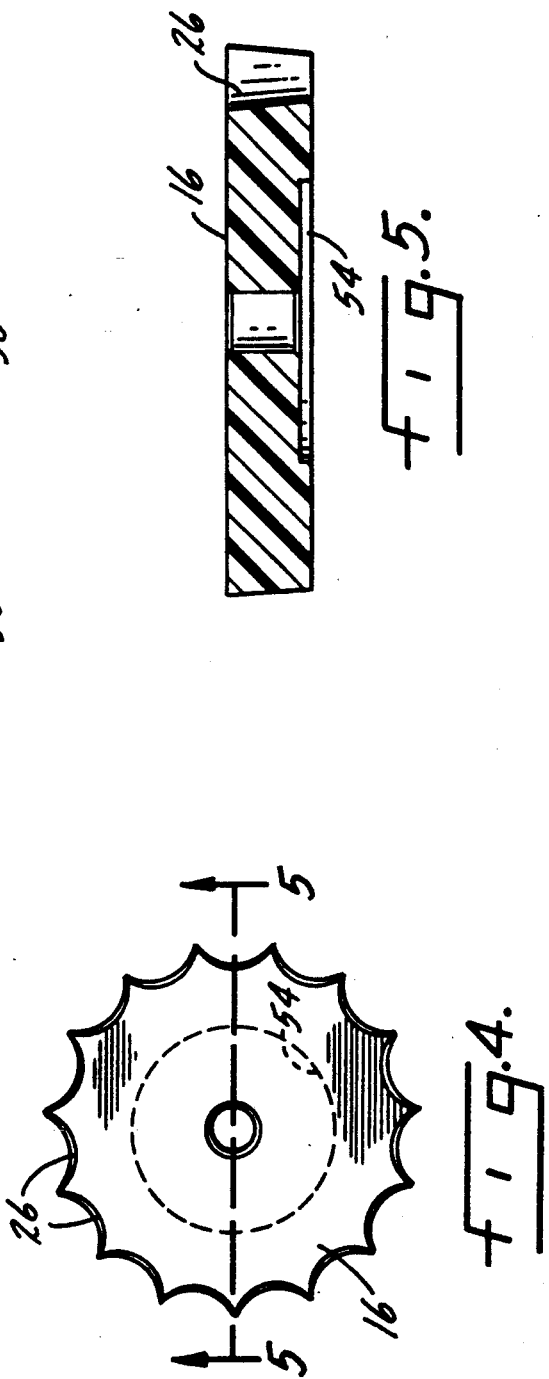

APPARATUS FOR PROPERLY POSITIONING VIALS

BACKGROUND OF THE INVENTION

This invention relates to apparatus for conveying vials and similar upstanding items, and in particular to an apparatus for properly positioning the vials both in speed and location as they are interfacing with a conveyor.

The apparatus according to the present invention is used particularly in connection with apparatus for testing the vacuum in the vials. In the applicant's U.S. Pat. No. 4,546,319, the disclosure of which is incorporated herein by reference, disclosed in one form is a rotational apparatus which captures vials from a conveyor, tests the vials, and if the vials pass the particular test, returns the vials to the conveyor for downstream handling.

As is evident by the nature of the apparatus of the '319 patent, however, vials are being transported by the conveyor at a particular conveyor surface speed, and are then shunted to the carrousel wheel, indexed around the wheel, and then returned to the conveyor. The vials both leave and enter the conveyor at substantially right angles to the direction of travel of the conveyor, and since the apparatus is operated at the highest speeds obtainable, often tall, thin vials, or small vials, tend not to accept the rapid changes of direction, and fall either when reentering the conveyor, or when exiting the conveyor to the carrousel wheel. Whenever vials are upset, the testing apparatus often must be temporarily halted until the vials are returned to their upstanding orientation Even if the apparatus need not be halted, however, an operator must constantly monitor the vials and manually return them to the upstanding orientation.

SUMMARY OF THE INVENTION

The invention relates to a device for properly positioning upstanding vials that are interfacing with a conveyor; that is, either exiting from the conveyor or entering upon the conveyor. The device includes a guide wheel which has a plurality of circumferential indentations, each of the indentations being shaped to engage a vial. A stationary guide is located adjacent to the guide wheel, the stationary guide being spaced from the guide wheel sufficiently to permit a vial to pass between the stationary guide and the guide wheel. A propulsion wheel is located beneath the guide wheel for driving the guide wheel, the wheels being aligned with a common rotational axis and being contiguous to one another. Means is provided for urging the wheels into frictional engagement with one another such that rotation of the propulsion wheel normally drives the guide wheel. The wheels are mounted above a conveyor at an angle to the conveyor so that one edge of the propulsion wheel rests on and is driven by the conveyor in order to drive the guide wheel.

In accordance with the preferred form of the invention, the wheels are mounted above the conveyor on an arm that extends from a stationary mounting. The wheels are mounted on an axle at the common axis, with the axle extending through the arm. The wheels are urged into frictional engagement with one another by means of a compression spring extending between a cap secured to a extension of the axle above the arm, and the arm itself. The axle preferably is rotatable within the arm.

The arm is secured to the stationary mounting by a horizontal pivot. Means is provided for forcing the arm downwardly to engage the one edge of the propulsion wheel on the conveyor. The forcing means preferably comprises a spring extending between the top of the arm and a fixed point on the stationary mounting, that fixed point comprising a vertical pin threadedly secured in the stationary mounting and extending upwardly through an aperture in the arm. The spring extends in compression between the top end of the pin and the top of the arm.

For proper frictional engagement, the propulsion wheel includes a bottom traction surface. The traction surface comprises a circumferential elastic ring, such as an 0 ring, secured to the bottom of the propulsion wheel.

The indentations in the guide wheel are formed such that the vials are held upright by the guide wheel. Each of the indentations includes a curved wall slanted relative to the axis of the wheels such that the wall is oriented vertically when the indentation is in registration above the edge of the propulsion wheel which rests on the conveyor when the device is operated.

BRIEF DESCRIPTION OF THE DRAWINGS

The invention is described in greater detail in the following description of an example embodying the best mode of the invention, taken in conjunction with the drawing figures, in which:

FIG. 1 is a top plan view of a device according to the invention, illustrated in its working relationship with a carrousel wheel, but with the conveyor omitted for clarity, FIG. 2 is an elevational view of the device according to the invention taken from the bottom of FIG. 1, and showing the conveyor in place, FIG. 3 is a side elevational illustration thereof, with a portion of the apparatus broken away and other portions in cross section in order to illustrate detail, and with the carrousel wheel omitted for clarity, FIG. 4 is a top plan view of a guide wheel according to the invention, and FIG. 5 is an enlarged cross-sectional view taken along lines 5—5 of FIG. 4.

DESCRIPTION OF AN EXAMPLE EMBODYING THE BEST MODE OF THE INVENTION

A device according to the invention is shown generally at 10 in the drawing figures. The device 10 is shown in its proper relationship to a carrousel wheel 12 and conveyor 14 of a testing apparatus such as that shown in incorporated U.S. Pat. No. 4,546,319.

The device 10 includes a guide wheel 16 and a propulsion wheel 18. The propulsion wheel 18 is located beneath the guide wheel for driving the guide wheel, with the two wheels 16 and 18 having a common rotational axis and being contiguous to one another. An axle 20 extends through the wheels 16 and 18, into and through a bearing 22 locating in an arm 24. The wheels 16 and 18 have central apertures therein for passage of the axle 20, the apertures being sized so that there is a close fit between the wheels 16 and 18 on the one hand, and the axle 20 on the other so that the wheels 16 and 18 and the axle 20 normally rotate in unison within the bearing 22. The axle 20 is not affixed to the wheels 16 and 18, however, and thus slippage is possible between the axle and the wheels.

The guide wheel 16 includes a series of equally spaced circumferential indentations 26, each of the indentations being shaped to engage a vial 28 as it exits (or enters) the carrousel wheel 12. Different sizes of vials 28 require different sizes of indentations 26, and therefore the guide wheel 16 is replaced as appropriate by a different guide wheel 16 having different size indentations 26 as different size vials 28 are accommodated by the device 10.

As explained in greater detail below, the arm 24 is canted downwardly when the device 10 is in operation, and therefore the indentations 26 are slanted relative to the longitudinal axis of the axle 20 such that the indentations 26 have walls that are oriented perfectly vertically at the location where the propulsion wheel 18 rests on and is driven by the conveyor 14, as best shown in FIG. 3. At this position, the vial 28 is released onto the conveyor 14 without being tipped or otherwise misaligned from its desired upright stance.

A stationary guide 30 is located adjacent to the guide wheel 16, being spaced from the guide wheel 16 sufficiently to permit the vials 28 to pass between the stationary guide 30 and the guide wheel 16. As shown in FIG. 1, the guide 30 extends from the location where vials 28 exit from the carrousel wheel 12 and are carried between the guide 30 and the guide wheel 16 to at least the location where the vials are traveling at the speed of and in the direction of the conveyor 14. Those two locations are illustrated by the two vials 28 shown in FIG. 1. The guide 30 may be lined with a non-slip material 32 such as Teflon, to reduce friction. The non-slip material 32 ensures that the guide 30 acts only as a guide for the vials 28, and does not interfere with their passage from the carrousel wheel 12 to the conveyor 14.

The arm 24 extends from a stationary mounting 34. The mounting 34 has a curved guide surface 36 which acts as a guide for vials as they are carried by the carrousel wheel 12. The arm is secured to the stationary mounting 34 by a horizontal pivot comprising a pin 38 extending through the arm 24 and through an upright 40 captured in a gap formed in the arm 24, as shown. Thus, the arm 24 pivots about the pin 38 relative to the stationary mounting 34.

The arm 24 is spring biased downwardly toward the conveyor 14. To this end, a spring 42 extends in compression between the top of the arm 24 and the head 44 of a vertical pin 46. The vertical pin 46 is threadedly engaged in the mounting 34 so that by judicious rotation of the pin 46, the tension of the spring 42 can be adjusted, thus adjusting the force by which the arm 24 is urged downwardly, engaging the propulsion wheel 18 on the conveyor 14.

The wheels 16 and 18 are not connected to one another. Only friction between the abutting surfaces of the wheels 16 and 18, and between the wheels 16 and 18 on the one hand and the axle 20 on the other, cause the wheel 18 to drive the wheel 16. To enhance the force of friction between the two wheels, a compression spring 48 extensions between a cap nut 50 and the bearing 22. The axle 20, at its other end, includes an enlarged head 52, and the length of the axle 20 is such that the top of the guide wheel 16 bears on the bottom of the bearing 22 so that by appropriate tightening of the cap nut 50, the force of compression of the spring 48 can be varied to enhance or diminish the frictional force between the abutting surfaces of the wheels 16 and 18. Also, as best shown in FIG. 5, the guide wheel 16 has a recess 54, and therefore only an outer annular portion of the guide wheel 16 is contiguous to the propulsion wheel 18. By appropriate enlargement or reduction of the recess 54, the surface area of contact between the wheels 16 and 18 can also be varied, thus varying the amount of frictional interference between the two wheels 16 and 18.

The stationary mounting 34 is secured to an appropriate fixed base 56 by means of a pair of bolts 58. The guide 30 has an extension 60 which is secured to the stationary mounting 34 by a pair of screws 62. The extension 60 is slotted beneath the screws 62 so that the stationary guide 30 can be adjusted relative to the guide wheel 16 to accommodate vials 28 of varying diameters.

Typically, the conveyor 14 has a surface of rubber or other similar material. For a proper driving interface between the propulsion wheel 18 and the conveyor 14, the propulsion wheel 18 includes a bottom traction surface comprising a circumferential elastic ring 64 set in and adhering to a circumferential groove extending about the bottom of the propulsion wheel 18. The elastic ring 64 is preferably of the same or a similar material as the surface of the conveyor 14 so that there is little chance of slippage between the wheel 18 and the conveyor 14 as the conveyor 14 is driven.

As explained above, there is only frictional interference between the wheels 16 and 18. Thus, the wheel 16 can rotate or slip relative to the wheel 18, if necessary. Often, vials 28 do not exit the carrousel wheel 12 directly in alignment with one of the indentations 26 of the guide wheel 16. To accommodate the lack of alignment, the guide wheel 16 is allowed to slip relative to the propulsion wheel 18 to prevent a jam and to allow a vial 28 to properly seat in one of the indentations 26. This slight slippage (normally a slowing of the rotational velocity of the guide wheel 16) does not cause any downstream vials to tip because any such vials ar captured between the guide 30 and the guide wheel 16, and therefore are held firmly in place without the possibility of tipping. Thus, a small amount of slippage between the guide wheel 16 and the propulsion wheel 18 does not at all adversely affect the functioning of the device 10.

In operation, the device 10 is mounted on the fixed base 56 adjacent to the carrousel wheel 12 such that the guide surface 36 forms part of an outer guide for vials 28 carried by the carrousel wheel 12. The guide wheel 16 is positioned to accept vials 28 exiting from the carrousel wheel 12, and the guide 30 is adjusted so that there is slightly more clearance between the indentations 26 of the guide wheel 16 and the guide 30 than the diameter of the largest vial 28, so that there is no interference as the device 10 is operated. A slight clearance is shown in FIG. 3 between the vial 28 and the indentation 26 in which the vial is held.

After the device 10 is in place, the vertical pin 46 is then adjusted to adjust the amount of compression force of the spring 42 which urges the arm 24 downwardly. Only one edge of the propulsion wheel 18 rests on and is available to be driven by the conveyor 14. If necessary, the cap nut 50 is also adjusted to vary the compression force of the spring 48 to affect any slippage between the guide wheel 16 and the propulsion wheel 18.

When the carrousel 12 is driven in the direction shown by the arrow in FIG. 1, and the conveyor 14 is driven in the direction shown by the arrow in FIG. 2, the propulsion wheel 18 and the guide wheel 16 are driven in unison in the direction shown by the arrow on the guide wheel 16 in FIG. 1. Because the propulsion wheel 18 bears at only one edge on the conveyor 14, and because that edge is substantially aligned with the indentations 26, the tangential speed of the guide wheel 16 is substantially equal to the surface speed of the conveyor 14. Thus, as the vials 28 are aligned to leave the embrace of the guide wheel 16 and guide 30, they are aimed in the direction of travel of the conveyor 14, and are released at the same surface speed as the speed of the conveyor 14. Therefore, there is practically no chance that the vials 28 can be upset, and the vials will remain upright for further travel down the conveyor 14.

The description of the device 10 and its operation set forth above has been generally with respect to handling of vials 28 as they exit the carrousel wheel 12 and reenter the conveyor 14. However, the device 10 can be employed equally as effectively to guide vials as they enter the carrousel 12. In relation to FIGS. 1 and 2, simply reversing the direction of rotation of the carrousel wheel 12 and the direction of travel of the conveyor 14 changes the device 10 from facilitating output of vials 28 to facilitating introduction of vials 28 to the carrousel wheel 12.

Various changes can be made to the invention without departing from the spirit thereof or scope of the following claims.

What is claimed is:

1. A device for properly positioning upstanding vials that are interfacing with a conveyor, comprising
   a. a guide wheel, said guide wheel having a plurality of circumferential indentations, each indentation being shaped to engage a vial,
   b. a stationary guide located adjacent to said guide wheel, said stationary guide being spaced from said guide wheel sufficiently to permit a vial to pass between said guide and said guide wheel,
   c. a propulsion wheel located beneath said guide wheel for driving said guide wheel, said wheels having a common rotational axis and being contiguous to one another,
   d. means for urging said wheels into frictional engagement with one another such that rotation of said propulsion wheel normally drives said guide wheel, and
   e. means mounting said wheels above a conveyor at an angle to the conveyor so that one edge of said propulsion wheel rests on and is driven by the conveyor.

2. A device according to claim 1 in which said mounting means comprises an arm extending from a stationary mounting.

3. A device according to claim 2 including an axle at said common axis about which said wheels rotate, said axle extending through said arm.

4. A device according to claim 3 in which said means for urging comprises a compression spring extending between a cap secured to an extension of said axle above said arm and said arm.

5. A device according to claim 3 in which said axle is rotatable within said arm.

6. A device according to claim 2 in which said arm is secured to said stationary mounting by a horizontal pivot.

7. A device according to claim 6 including means forcing said arm downwardly to engage said one edge of said propulsion wheel on a conveyor.

8. A device according to claim 7 in which said forcing means comprises a spring extending between the top of said arm and a fixed point on said stationary mounting.

9. A device according to claim 8 in which said fixed point comprises a vertical pin threadedly secured in said stationary mounting and extending upwardly through an aperture in said arm, said spring extending in compression between a top end of said pin and the top of said arm.

10. A device according to claim 1 in which said propulsion wheel includes a bottom traction surface.

11. A device according to claim 10 in which said traction surface comprises a circumferential elastic ring secured to the bottom of said propulsion wheel.

12. A device according to claim 1 in which said indentations each include a curved wall slanted relative to said axis such that said wall is oriented vertically when said indentation is in registration with said one edge.

* * * * *